United States Patent [19]

Traux

[11] 4,323,946
[45] Apr. 6, 1982

[54] APPARATUS FOR REDUCING ELECTROSTATIC CHARGE STORAGE AND EMI ON DIELECTRIC SURFACES

[76] Inventor: Robert L. Traux, 604 Danley Dr., Fort Myers, Fla. 33907

[21] Appl. No.: 77,273

[22] Filed: Sep. 20, 1979

[51] Int. Cl.³ .............................................. H05F 3/00
[52] U.S. Cl. ................................... 361/218; 244/1 A
[58] Field of Search ............... 361/212, 213, 216–218, 361/233; 244/1 A; 174/1, 2, 35 R, 35 GC; 219/203, 522; 428/38

[56] References Cited

U.S. PATENT DOCUMENTS

| | | |
|---|---|---|
| 2,323,461 | 7/1943 | Donelson . |
| 2,539,163 | 1/1951 | Robinson ............................ 361/218 |
| 3,289,060 | 11/1966 | Rubin ................................ 361/233 |
| 3,427,504 | 2/1969 | de la Cierva et al. . |
| 3,428,270 | 2/1969 | Knight et al. ...................... 244/1 A |
| 3,572,609 | 3/1971 | Slawson . |
| 3,600,632 | 8/1971 | Bright et al. . |
| 3,733,038 | 5/1973 | Ikrath et al. . |
| 3,755,713 | 8/1973 | Paszkowski . |
| 3,802,625 | 4/1974 | Buser et al. . |
| 3,857,066 | 12/1974 | Cline et al. ......................... 361/218 |
| 3,906,308 | 9/1975 | Amason et al. . |
| 3,989,984 | 11/1976 | Amason et al. . |
| 4,005,357 | 1/1977 | Parkinson ....................... 361/218 X |
| 4,078,107 | 3/1978 | Bitterice et al. ................. 219/203 X |

OTHER PUBLICATIONS

"Lightning Protection on Advanced Fighter Aircraft"-Weinstock Lightning & Static Electricity Conference-San Diego, Cal., 9–11 Dec. 1970.

*Primary Examiner*—Harry E. Moose, Jr.
*Attorney, Agent, or Firm*—Jenkins, Coffey, Hyland, Badger & Conard

[57] ABSTRACT

Passive and active devices reduce stored electrostatic charge levels on dielectric surfaces, while at the same time reducing electromagnetic interference due to streamer currents, by means of appropriately applied conductors, use of direct or alternating current power sources, ion flooding, fluid flooding and boundry layer control. In addition, the devices detect the presence, polarity and magnitude of triboelectric charging or stored charges on a dielectric surface for the purpose of signalling or of controlling active charge reduction devices. Moreover, the devices can be used to discourage lightning strikes. The devices can be applied with little if any impairment to optical or radio frequency energy transmission or reception.

20 Claims, 16 Drawing Figures

APPARATUS FOR REDUCING ELECTROSTATIC CHARGE STORAGE AND EMI ON DIELECTRIC SURFACES

BACKGROUND OF THE INVENTION

It is a well known fact that contact, and separation, of dissimilar materials can result in net electrical charging of each of the materials. Such triboelectric, or frictional, electrostatic charging can occur on dielectric, as well as electrically conductive materials. Other electrostatic charging operators, of the same or opposite polarity, can simultaneously effect the resultant net charge on a given body of material, or portion thereof, especially when the body is a heterogeneous combination of conductive and dielectric materials.

Triboelectric charge polarity on a body can be of either sign, and is a function of the type of dissimilar materials involved in the frictional contact. Charge rate, or charging current, is a function of material area, material type and the frequency and velocity of contacts between the dissimilar materials.

FIG. 1 depicts a typical dielectric 1 mounted on a conductive material 8, for instance metal. In this case, particles 2 of a differing construction are approaching and impacting on both the dielectric and metal. As the particles collide with the dielectric and metal surfaces and then separate from the contact, charges (4 or 5) are deposited on the impacted surfaces and the exiting particles 3 are themselves charged at the opposite polarity. This illustration could be represented by flight of an aircraft through precipitation, such as snow or rain, or even through masses of atmospheric suspended particulate matter like ice crystals or dust. Similar charging can be occasioned by simply rubbing dissimilar objects together, or as the result of flow of a fluid over a surface or through a pipe. Charges of both polarities are indicated in FIG. 1 (4 and 5), but contact between two materials of given compositions can be expected to generate only one set of polarities between the objects.

Some of the criteria that have been shown to influence stored electrostatic energy and potentials are: atmospheric or other fluid pressures; surrounding electric fields, especially when other charge centers or areas exist, and; such variables as relative humidity, surface contaminants, sharp points and so on. For instance corona and surface plasma breakdown potential thresholds approximately halve with each halving of atmospheric pressure. Also, dry air breaks down electrically at much higher potentials than air at higher relative humidities.

Several undesireable effects can result from electrostatic charging. When electric energy is stored by conductive material, or on dielectric surfaces, there can be a potential for electric shocks ranging from unpleasant to lethal in extreme cases. The electrical energy can ignite flammables. Sufficiently severe stored charges can puncture dielectrics, especially when they overlay or otherwise cover electrical conductors that are at a different electrical potential. If the charges penetrate electronic systems or devices they can be destructive. Finally, electromagnetic interference is created by surface streamer currents 6, corona discharges and dielectric punctures or other arcing 7.

There are no known means of preventing triboelectric charging during frictional contact between dissimilar materials. Therefore, to avoid the undesireable effects of triboelectric charging, means must be provided to discharge the resultant electrostatic charges.

An earthed conductive body will drain such electrostatic charges, and no net stored charge will result. An isolated conductive body will store the charges until corona threshold is reached, then, for a given charging rate, corona current will reach an equilibrium with the charging current. Because space charge impedes corona currents the stored energy on such an isolated conductive body is a direct function of charging current. When the charging source changes rate, or ceases to operate, the equilibrium time constant is quite short, typically ranging from a few nanoseconds to a few seconds, depending upon the stored energy levels and several other variables.

An isolated dielectric surface, on the other hand, will store triboelectric energy until the escape velocity of the generated ions is reached, the breakdown potential of surrounding fluids is achieved or the stored charge recombines with incidental ions of the opposite polarity. If the dielectric is part of a more complex structure, some or all of which is more conductive, and at a lower electrical potential than the stored charge on the dielectric, other mechanisms are likely to operate. The most common are surface streamer currents of the ions to the conductive structure. If the dielectric area is sufficiently large and conductive structure is at or near the reverse surface of the dielectric, or embedded in the dielectric, the dielectric strength may be exceeded with a resultant arc through the dielectric. This is commonly known as pinholing. Once pinholing occurs subsequent arcing pulses will occur through the pinhole at much lower potentials. Both streamer currents and arcing pulses are energetic producers of electromagnetic interference.

It has been demonstrated that dielectrics can store significant charges for hours even days. With the relatively rapid decay of stored energy from adjacent conductive bodies, the result can be very large potential differences between the dielectric surface stored charge and the conductive sections.

If the nearby conductive materials are charged at the same polarity, to near the same potential or at greater potentials than the dielectric surface, even larger stored charge energies can occur on the dielectric surface than if it were an isolated body, due to the shielding effect of the surrounding electric field. If the conductive structure charging rate is rapidly reduced, even more energetic energy releases can occur from the dielectric surface, since it is potential difference that generates streamer currents and arcing.

Current technology for reducing stored electrostatic energy on dielectrics relies on conductive coating of the dielectric surface that is subjected to charging. Such coating will distribute the electric charges uniformly over the coatings, or when bonded to conductive structure, or earthed, equalize or drain the charges.

Reasonable optical or radio frequency transparency can be obtained with current state-of-the-art conductive coatings. However, they are not always satisfactory for a number of reasons. On many dielectric materials adhesion of the coatings, at best, is difficult to achieve. Since the coatings are of necessity on the impacted triboelectrically charged, or otherwise charged, surface, maintenance of the coating and bonding integrity is frequently a source of difficulty. Erosion of the coatings by particle impact is a well known problem. Abrasion can also destroy part, or all, of the coatings or bonding provisions. Overcoating of the conductive material for decorative, erosion control or other reasons is difficult or sometimes impractical. Maintenance of coatings and bonding requires technical expertise that frequently is not available at user and service levels.

Failures of conductive coatings and electrical bonding can result in an increase of electromagnetic interference, compared to that of untreated dielectrics. For this and other reasons, such as cost, conductive coating of dielectrics may not be used, even though their benefits and desirability may be recognized.

SUMMARY OF THE INVENTION

The dielectric electrostatic energy storage and electromagnetic interference reduction devices of this invention may be used independently or in any combination, depending upon the needs of the user.

One feature of the invention is greatly improved service life and maintainability compared to charged dielectric surface conductive coatings. Properly applied, the embodiments of this invention can have service lives ranging from indefinite, to lives exceeding that of the dielectric material itself, in some applications with little or no maintenance.

The invention comprises either passive or active means for reducing or eliminating stored electrostatic charges and resultant electromagnetic interference. The methods and devices can be used in combination, if particular needs warrant.

The invention relies on increasing ion mobility. This is accomplished by one or more of the following: modifying the electric field in local regions; flooding the charged surface with ions of the opposite polarity; flooding the charged area with a flowing fluid, either gas or liquid and either conductive or non-conductive in nature, and; reduction of the stagnate boundry layer of fluids, by use of boundry layer control technology.

This invention provides for a simple electric charge polarity and magnitude sensor for signalling the presence of charging. The sensor can be used to turn on and off the active field modification devices of this invention. If desired, the detector can servo the active devices to more efficiently remove the stored charges.

While discussion of the subject of invention herein will be perceived by knowledgeable persons as directed to problems of aircraft, applications in other fields will be appreciated by those skilled in the art. Likewise, additional features and advantages of the dielectric surface charge collection devices will be appreciated by those skilled in the art upon further consideration of the following descriptions of preferred embodiments together with the attached figures.

DESCRIPTION OF PREFERRED EMBODIMENTS

Although presented separately, two or more of the embodiments of the subject invention can be used in combination to achieve particular ends or desires in reducing dielectric surface electrostatic charge, electromagnetic interference and dielectric failure.

Figure 1:
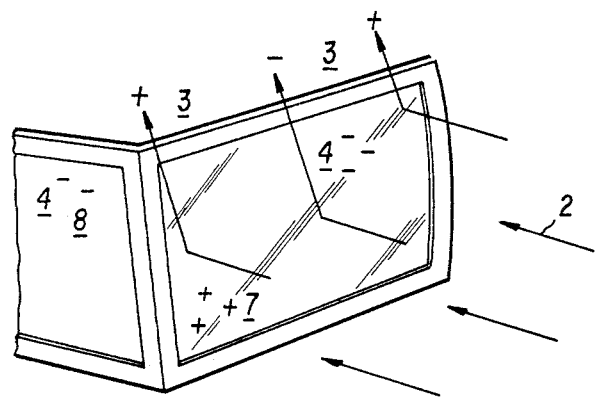
FIG. 1 illustrates the mechanism of triboelectric charging, charge storage on a dielectric surface, electrostatic streamer currents and arcing.
Figure 2:
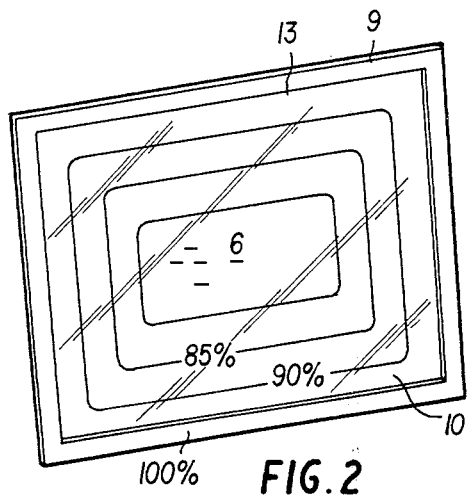
FIG. 2 represents electric field equipotential lines referenced to a conductive body surrounding a charged region stored on a dielectric surface.
Figure 3:
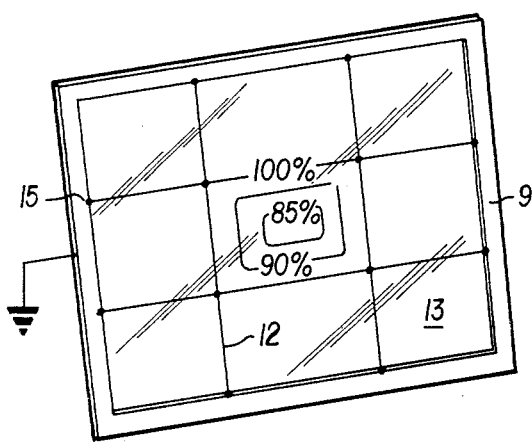
FIG. 3 shows how the stored charge migration path can be shortened and local field stresses, that encourage charge collection from a dielectric surface, can be enhanced by use of a geometric pattern of small conductors on the dielectric surface.

In the simplist embodiment, illustrated in FIG. 3, the surface of a dielectric 13 is covered by a grid 12, series of electrically connected concentric circles or any other appropriate geometric configuration of electrical conductors. The conductors are carried to one or more points 15 where they may be earthed or electrically connected to a conductive portion of the body 9 to which discharge of the dielectric is desired. In some cases charge equilibrium with adjacent structures, rather than full discharge of the dielectric surface, may be desired. The spacing of the conductors is determined by the residual stored charge levels sought. The conductivity, or resistivity, of the conductors may be varied based on electromagnetic frequency transmissivity required. The width and thickness, or diameter, of the conductors can be less than a micrometer and still be adequate to carry the electrical currents involved, based on demonstrated test data. Larger conductors than those required to carry the electrical currents may be desired for installation convenience or mechanical considerations. Laboratory tests have established that at standard day atmospheric conditions at sea level and severe charging levels, greater than those likely to be encountered naturally, on good dielectrics such as acrylics and polyethylenes with conductor to conductor spacings of 5 centimeters, residual stored charge levels of as little as a few hundred volts are attainable. With spacings of 20 centimeters residual stored charge levels of only a couple thousand volts can be realized. The conductors can be installed directly on the triboelectrically charged surface of the dielectric. They can also be installed slightly beneath the charging surface, with the result that somewhat higher residual charges will be stored, however, erosion and abrasion damage to the conductors can thus be avoided. It has also been shown that the conductors can be overcoated with paints without undue effect on their electrical performance in draining triboelectric charges.

FIGS. 4 through 9 represent an improved embodiment of the invention that offers all of the technical advantages of grids of surface or subsurface conductors. In this preferred embodiment of the invention, conductors 11 extend through all or part of the dielectric 13 to, or nearly to, the triboelectric impacted surface of the dielectric. The spacing of the conductors 11 can be varied to maintain surface stored charges at very low levels. The geometric arrangement of the conductors can also be varied to most effectively collect surface ions from complexly shaped bodies. The conductors are connected to conductive coatings, materials or wires, etc. (14), either on the inside surface, or laminated or otherwise formed within the dielectric material. The conductive connective materials are then connected or bonded by connections 15 to other conductive structure of a larger body, to an earthed ground or a sensor, such as those illustrated in FIGS. 8 through 12, for purposes of detecting charge polarity and magnitude. Working models using this technique have been constructed and tested, showing that even lower residual charges than those achieved by surface wire grids result from application of this embodiment.

When very small conductors 11 are used in an optimized geometric arrangement, and the charging source is removed, after a few to several seconds no residual stored charge could be measured. Conversely, untreated dielectric materials have been shown to be capable of storing very large charges for hours and even days.

Another major advantage of the embodiment illustrated by FIGS. 4 through 9 is that particle erosion or surface abrasion has no measureable effect on the conductors or interior connective material. It has also been demonstrated that by reducing the physical path length of the surface electrical currents, electromagnetic interference is significantly reduced. In using small conductors 11, some have been installed that have diameters of only a few micrometers, or even less than a micrometer, resulting in further reduction of electromagnetic interference. Additionally, it has been shown that if the connective material 14 is made resistive, further electromagnetic noise reduction results. Similarly, it has been established that use of resistive conductors 11 will also reduce electromagnetic interference.

The use of properly chosen resistive connecting material 14 and conductors 11 will allow transmission or passage of radio frequency energy. Such materials also have the advantage of not attracting or providing attachment locations for lightning strokes. If the conductors 11 are small enough and the connecting material 14 properly chosen, such as deposited metal films, optical transparency can be maintained, for use in windshields for instance. The film used in electrically heated windshields can double as the connective material 14.

In practice, the embodiment has been constructed and demonstrated using very small wires of only micrometer, or so, diameters for the conductors 11. Another preferred method of providing the conductors 11 has been accomplished by boring very tiny holes through the dielectric and allowing capillary pressure to draw conductive plastic through the holes. Properly chosen conductive plastics can remain flexible after curing and can also have good adhesion to the dielectric, thus effectively sealing the holes even during application of mechanical or fluid pressure stresses.

Figure 5:
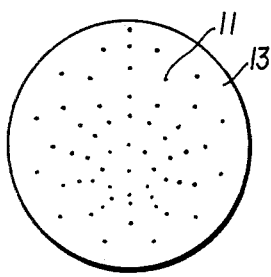
FIG. 5 is a frontal view of one method of arranging such dielectric penetrating conductors to collect particle wetted surface charges on a complexly shaped dielectric, for instance a radome.
Figure 6:
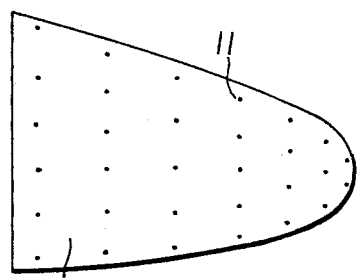
FIG. 6 is a side elevation of the dielectric body represented in FIG. 5.
Figure 7:
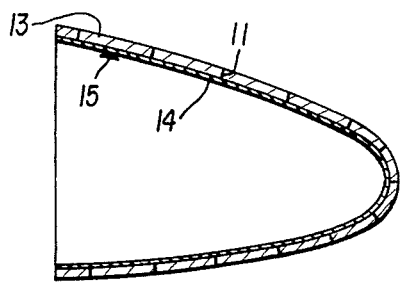
FIG. 7 is a cut-a-way drawing of FIG. 5 showing the penetration of the dielectric by the charge collection conductors and their connection to a conductive path to a common bonding point.

FIGS. 5 through 7 represent applications of the embodiment to complexly curved dielectric structures, such as for instance plastic radomes, wing tips, nacelles and so on.

Figure 4:
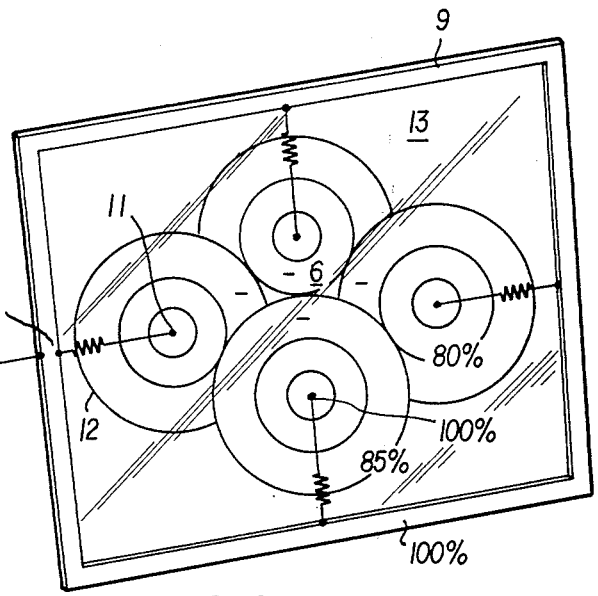
FIG. 4 indicates how small conductors that penetrate the dielectric and are connected on the reverse surface of the dielectric from the charges can provide the same, or better, charge collection field enhancement.
Figure 8:
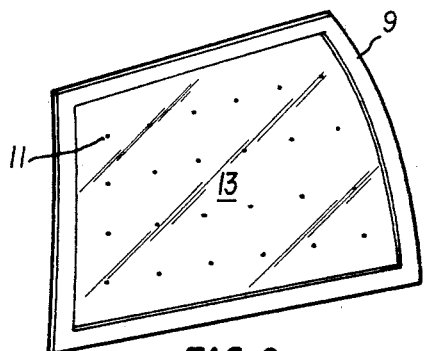
FIG. 8 shows an application of dielectric penetrating conductors and a conductively framed dielectric body, for instance an aircraft windshield.
Figure 9:
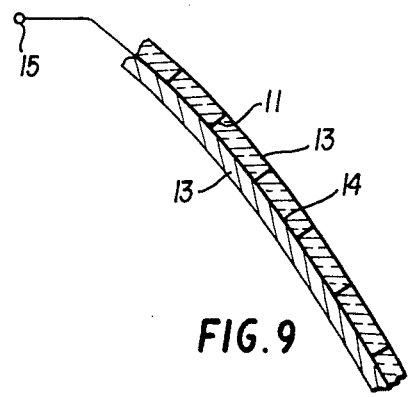
FIG. 9 is a cut-a-way view, showing how the conductive connective or coating can be laminated or otherwise contained within a dielectric body.

FIGS. 4, 8 and 9 represent for example a windshield surrounded by a metal frame 9.

The preferred embodiments taught above can be described as passive. Other preferred embodiments incorporate active means of reducing stored charge. Although not necessary in all cases, in the interest of energy conservation, life of the active components and other considerations a means of detecting the polarity and magnitude of triboelectrically deposited charges may be desireable.

Figure 13:
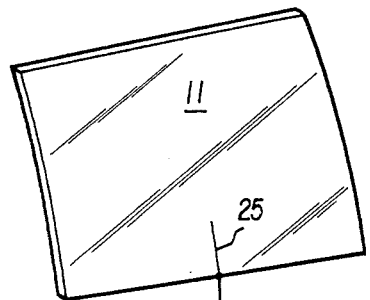
FIG. 13 is a simple schematic indicating how the presence, polarity and magnitude of charging currents or stored charge can be detected on a dielectric surface.

The simplist embodiment of such a detector is illustrated in FIG. 13. A conductor 25 can be placed on the charged surface of a dielectric 11. This conductor can be returned to an earthed ground or to conductive surrounding structure through an impedance path 17. The impedance path 17 would typically be arranged as an electrical signal divider, thus limiting current flow for the purpose of safety and protection of any connected detection or control devices. Passage of electrostatic current through the impedance path 17 will result in a potential V having a polarity and magnitude that is directly related to the charge polarity, magnitude and rate. It is obvious that the conductor 25 could be replaced by connection 15 to any of the passive charge collection embodiments represented by FIGS. 3 through 9.

Figure 10:
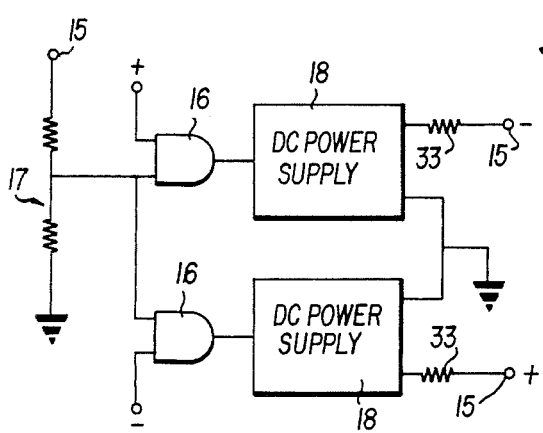
FIG. 10 is a schematic, showing how a direct current power source can be added to create an active charge collection system.

One preferred embodiment of an active system is represented by FIG. 10. This charge collection system makes use of the charge detection device of FIG. 12 to operate switching means 16 to turn on a direct current power supply 18 of a polarity opposite that of the stored charge. Time constants could be incorporated in the switching means 16, if needed, to prevent an oscillatory situation. Typically, current limiting impedances 33 would be installed between the power supplies 18 and the charge collection network to protect against shock hazards if contact were made with the network. Laboratory tests have shown that power supply potentials ranging from a few volts to more than a thousand volts can provide a satisfactory active system operation. The chosen operating potential would primarily be a function of the geometry of the charge collection network and the acceptable residual charge level on the dielectric charging events.

Figure 11:
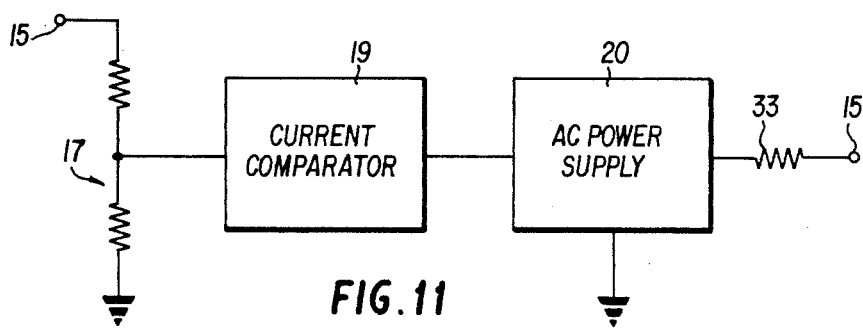
FIG. 11 is similar to FIG. 10, except the schematic depicts use of an alternating current source.
Figure 12:
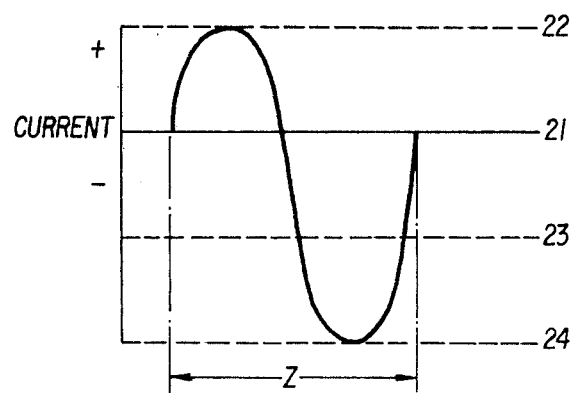
FIG. 12 shows how the presence of charging currents can be determined when the alternating current active system is used.

FIG. 11 depicts another active charge collection embodiment that makes use of an alternating current power supply. This embodiment is somewhat simplier in that collection of charges of either polarity may be accomplished. Control of the alternating current power supply 20 to turn it off when there is no triboelectric charging can be accomplished, if desired, by use of the charge current detector 17 and a current comparator 19, which may be of any of several well known designs. FIG. 12 shows how the collection of charges modifies the alternating signal at the detector 17. If no charges existed on the dielectric, the phases of the alternating signal would be equal in amplitude (22 and 24), but of opposite polarity. In the illustration, it is apparent that the negative cycle has a greater amplitude indicating a higher current flow by the difference between amplitudes 23 and 24, thus indicating the presence of charging. The frequency of the alternating current would be made low compared to the ion mobility time constant of the dielectric surface. The ion mobility time constant being a function of the physical configuration of the charge collection conductors for any given set of conditions such as atmospheric pressure, humidity, acceptable residual charge levels and so on.

Figure 14:
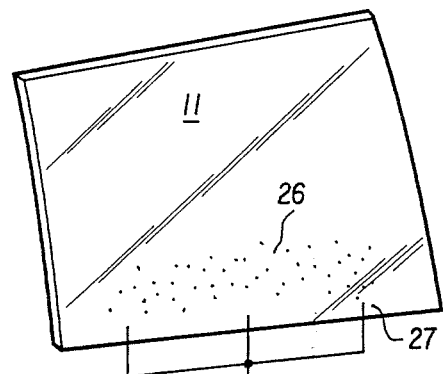
FIG. 14 illustrates how ion flooding can be utilized to neutralize triboelectric charging of a dielectric surface.

FIG. 14 represents an embodiment that requires no conductors in or on the dielectric 11. An ion generator 28 acts as a source of ions 26 of either polarity upon demand. Appropriately placed ion dischargers 27 are used to flood the dielectric with ions of an opposite sign and equal or nearly equal quantity to the ions deposited on the dielectric by the triboelectric charging. If desired, current limiting means 33 can be provided between the ion generator and the dischargers. Any appropriate source of ions can be used, such as, but not limited to, radioactive materials, small point corona dischargers driven by a power supply, etc.

Any of several type detectors can be used to servo the ion generator so that it provides the needed ions at the proper polarity. For instance, electric field detectors or the charge current detector taught herein could be used. One technique of this embodiment has been demonstrated to be very effective. This technique consists of maintaining corona dischargers at a potential just below their corona threshold with direct current or alternating current power supplies. The electric fields generated by the dielectric surface charges reduce the threshold of the corona dischargers, which are at the opposite polarity to the surface charges. Thus, recombiant ions are produced and no other charge presence detection system is required.

Figure 15:
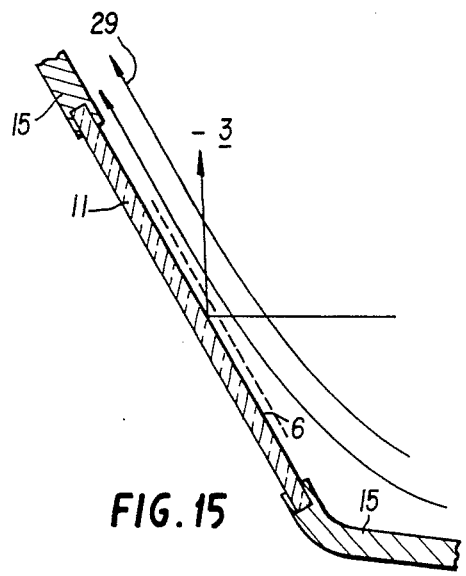
FIG. 15 is a cut-a-way drawing showing how electrostatic charges can pool in the stagnate fluid region of the boundry layer at the surface of a dielectric in a moving fluid.
Figure 16:
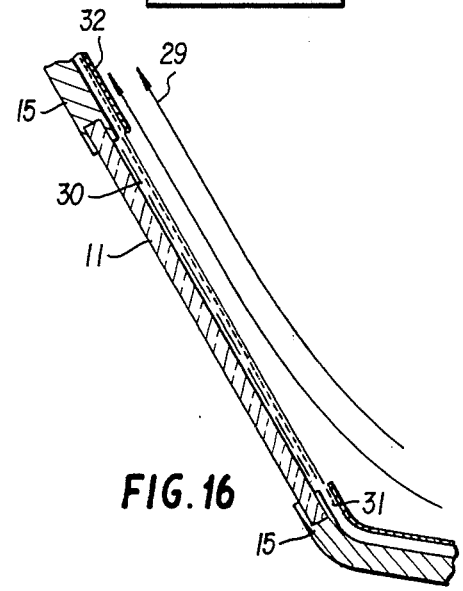
FIG. 16 illustrates how boundry layer control can be used to encourage electrostatic charge migration on a dielectric surface and also represents similar use of fluid flooding.

The last preferred embodiment is particularly appropriate to aircraft. The charges when mobility have been reduced by their location in the relatively stagnate air of a boundry layer 6, shown in FIG. 15, are encouraged to move to nearby conductive structure 15, as shown in FIG. 16. The fast moving air 29 is kept from impending directly on the dielectric by the boundry layer of stagnate air. However, this boundry layer may be largely, if not entirely, eliminated by a fluid source 31 which directs a flow of fluid over and parallel to the charged dielectric surface, thus increasing the mobility of the ions 31 and thereby reducing the stored charge. The fluid may be ram air, engine bleed air, conductive or non-conductive liquids, or any other suitable medium. To further increase the fluid flow and ion mobility, a low pressure sink 32 can also be incorporated into practical designs. Residual charges may be somewhat higher in this embodiment than in the others disclosed, but dependent upon the application the charge reduction can be adequate to the needs. This embodiment can, of course, be combined with application of one or more of the other embodiments herein described.

A SUMMARY OF THE DISCLOSURE

The least complicated application of the invention is the grid of conductors attached to the surface of the dielectric as shown in FIG. 3. The ion mobility is enhanced by proximity of the conductors to the stored charges, thus increasing the acceleration of the ions, especially near the center of the dielectric. This proximity couples the accelerating electric fields much more tightly to the majority of the stored charges. In addition to the significant residual charge reduction, electromagnetic noise is reduced due to both the shorter charge flow path and the lower charge density (current) in the resultant streamers. The conductors may be overcoated with paints or other thin dielectrics, or be embedded just below the surface of the dielectric with only a small increase in residual charge levels or radio frequency noise. Spacing of the conductors should be determined by the acceptable residual charge levels and, if appropriate, the breakdown potential of the dielectric.

The grid, while simple and very effective, suffers at least some of the shortcomings of conductive coatings. To eliminate these objections, the conductors may be arranged as shown in FIGS. 4 through 9. In this embodiment, the conductors penetrate, or nearly penetrate, the dielectric and are connected to a protected conductive grid or coating on the reverse side of the dielectric. As shown in FIG. 9, the connective conductors can even be embedded or laminated within the dielectric body.

If very small conductors, or conductors with sharp edges penetrate the dielectric it has been shown that even smaller residual charges will be stored on the charged dielectric surface. Electromagnetic interference generation is similarly reduced. This results primarily as a consequence of the intense electric field coupling in the vicinity of small points or sharp radii.

A very high, seldom if ever encountered, triboelectric charge rate would be 500 microamperes per square meter. It has been demonstrated that conductors of 4 micrometers diameter can carry currents of more than an order of magnitude greater than this quantity for sustained periods. Since the spacings of the conductors, whether grids or points, would normally be at fractions of a meter very small conductors can easily carry the discharge currents. Such small conductors are nearly invisible to the naked eye, especially in short lengths such as those required for dielectric penetrating conductors. Also, if such conductors were very short compared to a radio frequency wavelength they would present very little impedance to such energy.

It has also been shown that by making the grid of conductors, points and connective conductors resistive, for instance, several megohms or more, additional interference reduction is achieved. This results from decreased slope of rise and decay times of the discharge pulses, as well as the lower amplitude of the pulses. The resistive conductors also reduce coupling to the radio frequency fields.

Another advantage of resistive conductors is that they tend to not support the currents of lightning step leaders. As a result destructive lightning stroke currents are very unlikely to attach to these conductors. The penetrating conductors, at spacing proven practical to the application of this invention, will not support nor encourage the surface plasma of lightning energy that has been destructive to external conductive coatings on dielectrics.

It should also be noted that the conductive grids or penetrating points can be so connected that they themselves can be the sensor element 25 of the detector illustrated in FIG. 13.

The same residual charge levels and noise reduction can be achieved at much larger spacings of the conductive grid or penetrating points by application of electrical potentials to the charge collection conductors. These potentials increase the electric field concentrations about the conductors, thereby increasing ion mobility. Applications of such active devices are represented by FIGS. 10 and 11. These active devices can improve both economy of application of the invention and transparency at electromagnetic frequencies of interest.

FIG. 16 shows how ion mobility may be increased by fluid flooding or boundry layer control. In this instance electric fields are affected only by the increased ion mobility. Discharge paths are not shortened. Electromagnetic interference is reduced only by the reduction in unit time stored charge levels. The sensor device can be used to reduce the expenditure of consummables if fluids are used for which tankage must be provided.

The ion flood device shown in FIG. 14 reduces, or eliminates, stored charge by provision of ions of opposite polarity. Electromagnetic noise is reduced because of the very short ion flow paths necessary to cause recombination and neutralization. Control of the quantity and polarity of flood ions is necessary to ensure their sufficiency and to avoid charging of the dielectric surface by the flood generator itself.

While forms of apparatus herein described constitute preferred embodiments of the invention, it is to be understood that the invention is not limited to these precise forms of apparatus and that changes may be made without departing from the scope of the invention which is defined in the appended claims.

What is claimed is:

1. Apparatus for reducing residual electrostatic charge levels on an exposed dielectric surface of an aircraft body, the apparatus comprising:
   a plurality of small diameter charge collection conductors projecting through the body and terminating at least adjacent to the dielectric surface for collecting around the charge collection conductors electrostatic charges accumulated on the surface;
   conductive connecting means electrically connected to the charge collection conductors and disposed behind the dielectric surface for conducting the charges collected around the charge collection conductors away from the dielectric surface, and
   a conductive air frame disposed adjacent to the dielectric surface and connected to the conductive connecting means for grounding the electrostatic charges conducted through to the conductive connecting means by the charge collecting conductors.

2. The apparatus of claim 1 where the dielectric surface is on a windshield of an aircraft and the conductive frame is at least a portion of the airframe of the aircraft.

3. The apparatus of claim 1 wherein the dielectric surface is on a canopy of an aircraft and the conductive frame is at least a portion of the airframe of the aircraft.

4. The apparatus of claim 1 wherein the dielectric surface is on an exposed surface of an aircraft and wherein the conductive frame is at least a portion of the airframe of the aircraft.

5. The apparatus of claims 1, 2, 3 or 4 wherein the plurality of charge collection conductors terminate slightly beneath the dielectric surface.

6. The apparatus of claims 1, 2, 3 or 4 wherein the charge collection conductors have a diameter less than approximately twenty-five micrometers to minimize optical interference should the dielectric be transparent.

7. The apparatus of claims 1, 2, 3 or 4 wherein the charge collection conductors are formed of conductive plastic having a relatively high resistivity.

8. The apparatus of claims 1, 2, 3 or 4 wherein the body has holes therein for receiving the charge collection conductors and wherein the charge collection conductors are formed of conductive plastic having a relatively high resistivity and are inserted into the holes by capillary action.

9. The apparatus of claims 1, 2, 3 or 4 wherein the conductive connecting means is a layer of conductive material.

10. The apparatus of claims 1, 2, 3 or 4 wherein the conductive connecting means is a grid made of conductive material.

11. The apparatus of claims 1, 2, 3 or 4 wherein the body is a laminate and the conductive connecting means is disposed between the layers thereof.

12. The apparatus of claims 1, 2, 3 or 4 further including means for active electric field enhancement wherein said means includes a power supply circuit electrically connected to the charge collection conductors thereby further reducing residual electrostatic charges.

13. The apparatus of claims 1, 2, 3 or 4 further comprising:
   direct current power supply means electrically connected to the charge collecting conductors, the direct current power supply means including means for applying selectively positive and negative potentials to the charge collecting conductors;
   means for determing the polarity and magnitude of the electrostatic charge, and
   means for switching the power supply to apply a positive potential to the charge collecting conductors if the residual electrical charge is negative and a negative potential to the charge collecting conductors if the residual electrostatic charge is positive.

14. The apparatus of claims 1, 2, 3 or 4 further comprising an alternating current power supply electrically connected to the charge collection conductors;
   means for determing the polarity and magnitude of the electrostatic charge on the dielectric surface, and comparitor means for activating the alternating current power supply to reduce the residual electrostatic charges on the dielectric surface.

15. The apparatus of claims 1, 2, 3 or 4 wherein the charge collecting conductors have diameters in the range of approximately one to twenty-five microns and are spaced distances in the range of five to twenty centimeters apart.

16. Apparatus for reducing residual electrostatic charge levels on a dielectric body having a dielectric surface exposed to a stream of air wherein the body is supported by a conductive frame, the apparatus comprising:
   a plurality of small diameter charge collection conductors projecting through the dielectric body and terminating at least adjacent to the dielectric surface for collecting therearound electrostatic charges accumulated on the dielectric surface;

conductive connecting means electrically connected to the charge collection conductors and to the conductive frame for conducting charges collected around the charge collection conductors away from the dielectric surface and to the conductive frame.

17. The apparatus of claim 16 further including means for reducing surface stagnation adjacent the dielectric surface due to boundary layer effects, wherein said surface stagnation means includes means for flooding the dielectric surface with a fluid.

18. The apparatus of claims 16 or 17 further including means adjacent the dielectric surface for flooding the dielectric surface with ions of a polarity opposite the polarity of the electrostatic charge level.

19. Apparatus for reducing residual electrostatic charge levels on an exterior dielectric surface of an aircraft canopy made of a dielectric material, the apparatus comprising:
 a plurality of small diameter charge collection conductors projecting into the canopy and terminating at least adjacent to the exterior surface thereof for collecting around the charge collection conductors electrostatic charges accumulated on the surface;
 a conductive grid electrically connected to the charge collection conductors and disposed behind the exterior surface for conducting the charges collected around the charge collection conductors away from the exterior surface, and
 a conductive air frame disposed adjacent to the dielectric exterior surface and connected to the conductive grid for grounding the electrostatic charges conducted through to the grid by the charge collecting conductors.

20. Apparatus for reducing residual electrostatic charge levels on an exterior dielectric surface of an aircraft windshield made of a dielectric material, the apparatus comprising:
 a plurality of small diameter charge collection conductors projecting into the windshield and terminating at least adjacent to the exterior surface thereof for collecting around the charge collection conductors electrostatic charges accumulated on the surface;
 a conductive grid electrically connected to the charge collection conductors and disposed behind the exterior surface for conducting the charges collected around the charge collection conductors away from the exterior surface, and
 a conductive air frame disposed adjacent to the dielectric exterior surface and connected to the conductive grid for grounding the electrostatic charges conducted through to the grid by the charge collecting conductors.

* * * * *

UNITED STATES PATENT AND TRADEMARK OFFICE
CERTIFICATE OF CORRECTION

PATENT NO. : 4,323,946
DATED : April 6, 1982
INVENTOR(S) : Robert L. Truax

It is certified that error appears in the above-identified patent and that said Letters Patent are hereby corrected as shown below:

On the the title page, Item [75],
for the last name of the inventor, replace "Traux"

with --Truax--.

Signed and Sealed this

Thirteenth Day of July 1982

[SEAL]

Attest:

Attesting Officer

GERALD J. MOSSINGHOFF

Commissioner of Patents and Trademarks